United States Patent [19]

Mitchell et al.

[11] 4,247,045
[45] Jan. 27, 1981

[54] AUTOMATIC VOLUME CONTROL SYSTEM

[75] Inventors: Wayne R. Mitchell, Muncy; Kenneth Wands, Riverside, both of Pa.

[73] Assignee: Prismo Universal Corporation, Montgomery, Pa.

[21] Appl. No.: 31,964

[22] Filed: Apr. 20, 1979

[51] Int. Cl.³ .............................................. B05B 9/06
[52] U.S. Cl. ................................................. 239/156
[58] Field of Search ...................... 239/155, 156, 157; 222/614

[56] References Cited

U.S. PATENT DOCUMENTS

| 3,344,993 | 10/1967 | Wilder | 239/156 X |
| 4,019,685 | 4/1977 | Tangeman | 239/156 |
| 4,093,107 | 6/1978 | Allman | 222/614 X |

Primary Examiner—Richard A. Schacher
Attorney, Agent, or Firm—Cushman, Darby & Cushman

[57] ABSTRACT

An automatic volume control system for controlling the rate at which fluid, such as paint, is sprayed from spray guns on a mobile vehicle as a function of vehicle speed. The device permits paint lines to be maintained at a uniform thickness independently of the vehicle speed. A tachometer generator generates a voltage proportional to the vehicle road speed which voltage controls the opening of an adjustable hydraulic valve. Hydraulic fluid passing through the hydraulic valve drives a hydraulic generator which in turn drives a spray gun system. The voltage from the tachometer generator thereby causes the hydraulic fluid to drive the hydraulic motor and paint pump at a rate which is proportional to the vehicle road speed. The hydraulic fluid is suitably pumped through the hydraulic valve to the hydraulic motor by a hydraulic pump driven by the power take-off of the vehicle. By using a flow divider valve connected between the hydraulic pump and the hydraulic motor, two separate and parallel independently controllable painting systems may be provided. An intermittent line mechanism powered by the vehicle road wheels, is connected to the spray guns and to hydraulic motor bypass valves in order to provide line patterns which are independent of vehicle road speed.

13 Claims, 2 Drawing Figures

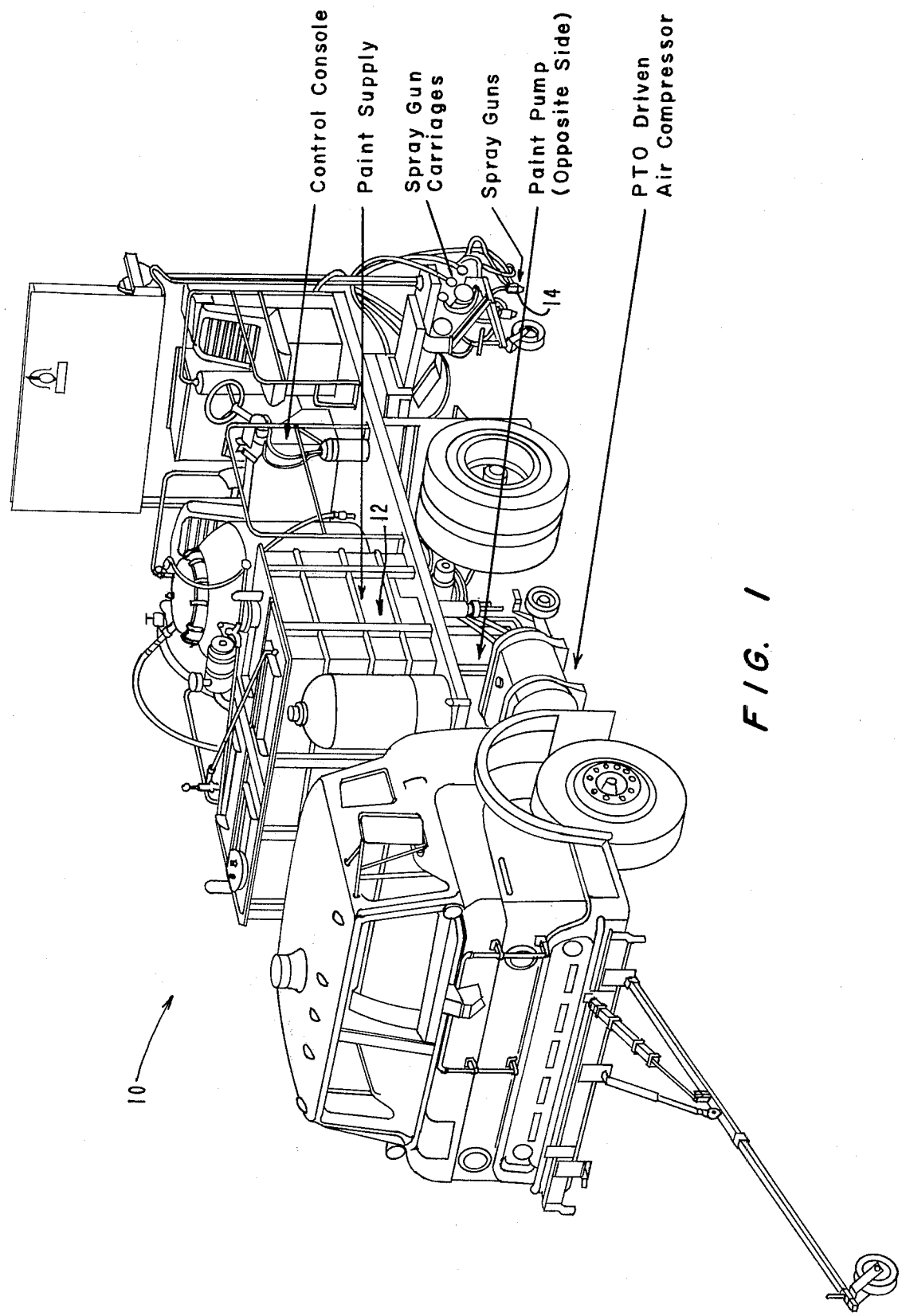

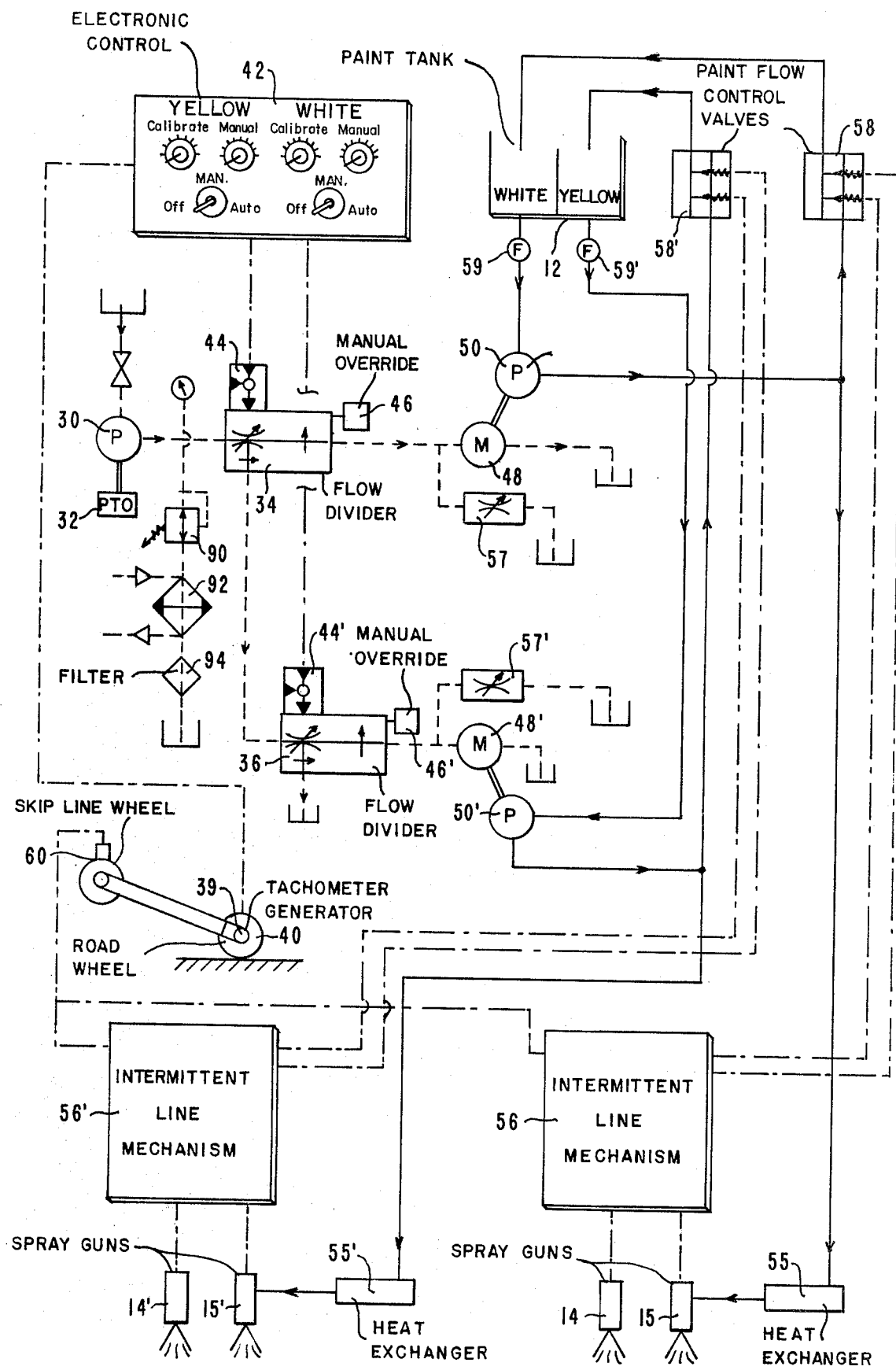

AUTOMATIC VOLUME CONTROL SYSTEM

BACKGROUND AND SUMMARY OF THE INVENTION

The present invention relates to fluid spray volume control and more particularly to an automatic volume control system for controlling the rate at which a substance, such as paint, is deposited on an adjacent surface from a mobile vehicle as a function of vehicle speed.

It is necessary during the application of quick drying road marking materials, such as paint, that the material be applied at a thickness which is within fairly rigid upper and lower limits. If the line is too thick, the material will not dry in the prescribed time. If the line is too light, then the material will not hold its beads or will not be as durable as may be required. A factor which results in uneven paint thickness is intentional or unintentional variation in vehicle speed. In order to maintain the proper constant line thickness, the paint flow should be increased and decreased in direct proportion to increases and decreases in vehicle speed.

On conventional vehicle mounted line painting machines paint flow must be manually controlled by an operator as by manually backing off the pressure regulator or opening and closing a needle bypass valve. There is no means for automatically changing the volume requirement to correspond to the vehicle road speed.

A number of disadvantages result from the manual method of volume control. The operator must be constantly monitoring the vehicle speed and the level of paint flow, removing his attention from the other aspects of vehicle control. Human error is likely to result in line thicknesses which are uneven or incorrect thickness.

A method of metering the thickness of the paint in accordance with the vehicle speed which has been tried is to use gear pumps powered by the vehicle power take-off. The power take-off increases and decreases with the road speed of the vehicle in a specific gear, so that as the pumps go faster or slower they would meter the thickness of the paint, at least to an approximation, to correspond to the vehicle speed. However, this method has a serious disadvantage in that the mechanical drives on the gear pumps interfere with the operation of the vehicle.

The present invention overcomes the disadvantages of the prior art by providing an electronic servo system, a tachometer generator driven from one of the road wheels, which applies a voltage which is proportional to the road speed to a hydraulic valve. The hydraulic valve permits hydraulic oil to pass at a rate proportional to the applied voltage and thus to the vehicle speed.

A hydraulic pump driven by the vehicle's power take-off pumps the hydraulic oil through the hydraulic valve. The hydraulic oil in turn powers a hydraulic motor that drives a paint pump which forces paint through one or both of a pair of spray guns. The paint pump should have fairly linear characteristics so that the volume of paint pumped is proportional to the speed of the hydraulic motor and thus the road speed of the vehicle. A dual orifice bypass valve is connected across the spray guns. An intermittent line mechanism also responsive to the speed of the vehicle, is capable of intermittently, synchronously opening and closing one or both valve orifices as it turns off and on one or both of the two spray guns. The intermittent line mechanism is electrically powered by the same road wheel that drives the tachometer generator and, as is well known, is responsive to wheel speed to provide single or double intermittent lines of paint of constant length at any road speed.

In one embodiment of the invention, two separate and parallel painting systems are provided so that two colors or types of paint may be used simultaneously, e.g., yellow paint and white paint. In accordance with this embodiment, hydraulic fluid from the hydraulic pump is divided by a flow divider valve and directed to separate hydraulic valves each of which is controlled by a voltage from the tachometer generator. Separate hydraulic motors, paint pumps and spray guns are used, connected to the adjustable hydraulic divider valves as described above.

As a result of this invention, a paint truck operator need not be concerned with the film thickness of the paint lines and a constant thickness independent of vehicle speed is obtained.

BRIEF DESCRIPTION OF THE DRAWINGS

These and other advantages of the invention are apparent from the following detailed description of the preferred embodiment illustrated in the accompanying drawings in which:

FIG. 1 is a perspective view of a paint truck as might contain the volume control system of the present invention; and FIG. 2 is a combined schematic diagram of the electrical and hydraulic diagram of the preferred embodiment of the invention.

DETAILED DESCRIPTION OF THE PREFERRED EMBODIMENT

Referring first to FIG. 1, there is shown a road line painting truck 10 which may incorporate the automatic volume control system disclosed herein. The invention controls the flow of paint from paint supply 12 through spray guns 14 and 15 driven by a paint pump (not shown in FIG. 1), and opened and closed by an intermittent line mechanism (not shown in FIG. 1).

The system for automatically controlling the rate of flow of a substance such as paint from a moving vehicle such as is shown in FIG. 1 is illustrated in FIG. 2. In accordance with the preferred embodiment of the invention, a fixed displacement hydraulic pump 30, driven by a power take-off 32 on the truck 10 pumps hydraulic fluid to an adjustable divider valve (servo valve) 34 having an automatically adjustable orifice and a second orifice which is normally fixed and which directs a portion of the hydraulic fluid to an identical second adjustable divider valve 36. In accordance with the preferred embodiment, a portion of the fluid from pump 30 is continuously treated by passing through a P. H. relief valve 90, a gaseous cooling mechanism 92 and a filter 94. Servo valves 34 and 36 are each independently adjustable at their adjustable orifices and are connected to separate means for spraying a substance such as paint from the vehicle in a controlled manner as will be described. One spraying means may be for one type of paint and the other for spraying another type of paint, e.g., white paint and yellow paint. Since these means are substantially identical, only one such means will be described. In FIG. 2 a primed number indicates substantially the same elements as the same unprimed number.

Adjustable valve 34 is automatically adjusted according to the speed of the vehicle by a voltage generated by a tachometer generator 39 which generator is responsive to the speed of road wheel 40. The tachometer generator 39 controls the adjustable orifice of adjustable valve 34 through a control unit 42 which contains means for calibrating the signal from the tachometer 39 and switches which permit the system to be operated in either a manual or auto mode. Dials on unit 42 permit the paint thickness to be adjusted to the appropriate level for each of the paints being utilized. The output of control unit 42 drives valve adjustment mechanism 44. A manual override device 46 permits manual operation of the valve 34 when the automatic control means is malfunctioning. Hydraulic fluid passing through valve 34 drives hydraulic motor 48 which, in turn, drives a pump 50, typically a paint pump, which causes the substance to be sprayed, i.e., the white paint, to be forced from paint supply 12 through spray guns 52 and 54. Variable hydraulic bypass valve 57 is suitably connected in parallel with hydraulic motor 48. A paint filter 59 is suitably disposed between paint supply 12 and paint pump 50. A heat exchanger 55 is suitably disposed between pump 50 and spray guns 14 and 15. Hydrauliic motor 48 may suitably be a Char-Lynn Series "S" motor.

The system of this invention may be used for spraying glass in addition to paint. The spray guns 14 and 15 may comprise double and single color continuous bleed type paint guns or automatic pressure injection glass guns. Typically quick drying road marking materials are applied at 15 mils thickness.

Line painting vehicles of the kind described typically include an intermittent line mechanism 56 which can be set to turn spray gun 14 and/or spray gun 15 on and off at a rate proportional to the vehicle speed in order to obtain dashed lines of a preset length. In accordance with this aspect of the invention, the vehicle speed is communicated to the intermittent line mechanism 56 by skipline wheel 60 which develops skipline pulses at a rate proportional to the speed of road wheel 40. The intermittent line mechanism 56 is also connected to a dual orifice bypass valve 58 which bypasses paint around spray guns 14 and 15 when one or both of spray guns 14 and 15 are closed and returns the bypassing paint to paint supply 12. In this way, a continuous flow of paint is driven by paint pump 50 and hydraulic motor 48 is run at a continuous RPM relative to road speed, regardless of whether none, one or two spray guns are open as the various road line patterns require.

As indicated above, a similar system for spraying yellow paint, whose components are designated by primed (') numerals, is connected to adjustable bypass valve 36. In an alternate embodiment, the intermittent line mechanism may suitably comprise a single unit including an electronic solid state counter capable of providing intermittent line pattern control to all four spray guns 14, 15, 14' and 15' and both dual orifice bypass valves 58 and 58'.

Although only one exemplary embodiment of this invention has been described in detail above, those skilled in the art will readily appreciate that many embodiments are possible in the exemplary embodiment without materially departing from the novelty teachings and advantages of this invention. Accordingly, all such modifications are intended to be included within the scope of this invention as defined in the following claims.

What is claimed is:

1. A system for automatically controlling the rate at which a substance is deposited from a moving vehicle onto an adjacent surface to form a coating of uniform thickness, comprising:
    a first hydraulic motor and a second hydraulic motor;
    a hydraulic pump for pumping hydraulic fluid through said first and second hydraulic motors to operate said first and second motors at rates which vary as a function of the rates which fluid is pumped therethrough;
    adjustable valve means for limiting the rates of flow of hydraulic fluid between said hydraulic pump and said first and second hydraulic motors, respectively;
    first means, connected to and operated by said first motor, for depositing said substance at a rate which varies with the rate of operation of said first motor;
    second means, connected to and operated by said second motor, for depositing said substance at a rate which varies with the rate of operation of said second motor; and
    means for automatically adjusting said adjustable valve means in order to control the rates of fluid flow through said adjustable valve means as a function of vehicle speed to cause a uniform coating to be deposited;
    said adjustable valve means including first and second adjustable valves for respectively adjusting said rates of flow to said first and second hydraulic motors.

2. A system as in claim 1 further comprising means, disposed between said hydraulic pump and said first and second hydraulic motors, for dividing said hydraulic fluid flow from said hydraulic pump between said first and second hydraulic motors.

3. A system as in claim 2 wherein said dividing means comprises a flow divider valve having a first and a second oriface.

4. A system for automatically controlling the rate at which a substance is deposited from a moving vehicle onto an adjacent surface to form a coating of uniform thickness comprising:
    a first hydraulic motor and a second hydraulic motor;
    a hydraulic pump for pumping hydraulic fluid through said first and second hydraulic motors to operate said first and second motors at rates which vary as a function of the rate at which fluid is pumped therethrough;
    adjustable valve means for limiting the rate of flow of hydraulic fluid between said hydraulic pump and said first and second hydraulic motors;
    means connected to and operated by said first motor for depositing said substance at a rate which varies with the rate of operation of said first motor; and
    means for automatically adjusting said adjustable valve means in order to control the rate of fluid flow through said adjustable valve means as a function of vehicle speed to cause a uniform coating to be deposited;
    said adjustable valve means including a flow divider valve having a first and second output orifice disposed between said hydraulic pump and said first and second hydraulic motors, for dividing said hydraulic flow from said hydraulic pump between said first and second hydraulic motors; and first and second adjustable valves for respectively adjusting said rate of flow to said first and second hydraulic motors.

5. A system as in claim 4 further comprising means for manually overriding said automatic valve adjusting means.

6. A system as in claim 4 wherein said depositing means includes means for spraying said substance from said vehicle.

7. A system as in claim 6 wherein said spraying means comprises at least one spray gun and a substance pump for forcing said substance through said at least one spray gun.

8. A system as in claim 7 further comprising:
controllable means, disposed between said adjustable valve means and said hydraulic motor, for causing said hydraulic fluid to bypass said hydraulic motor;
means, responsive to said vehicle speed, for turning on and off each said at least one spray gun and controlling said controllable bypass means so that the amount of hydraulic fluid bypassing said at least one hydraulic motor increases for each spray gun that is turned off.

9. A system as in claim 8 wherein said controllable bypass means comprises a bypass valve having two output orifices; and
said at least one spray gun includes two spray guns.

10. A system for automatically controlling the rate at which a substance is deposited from a moving vehicle onto an adjacent surface to form a coating of uniform thickness as a function of vehicle speed comprising:
first and second hydraulic motors;
hydraulic pump means for pumping hydrauic fluid through said first and second hydraulic motors to operate said first and second motors at a rate which varies as a function of the rates of fluid pumped therethrough;
first adjustable valve means disposed between said hydraulic pump means and said first hydraulic motor, for limiting the rate of flow of hydraulic fluid between said hydraulic pump means and said first hydraulic motor;
second adjustable valve means disposed between said hydraulic pump means and said second hydraulic motor, for limiting the rate of flow of hydraulic fluid between said hydraulic pump means and said second hydraulic motor;
first depositing means, connected to and operated by said first motor, for depositing said substance at a rate which varies with the rate of operation of said first motor, said first depositing means including a first substance pump and a first plurality of spray guns;
second depositing means connected to and operated by said second motor, for depositing said substance at a rate which varies with the rate of operation of said second motor, said second depositing means including a second substance pump and a second plurality of spray guns;
means, including a tachometer generator, for automatically adjusting said first and second adjustable valve means in order to control the rates of fluid flow through said first and second adjustable valve means as a function of vehicle speed to cause a uniform coating of said substance to be deposited;
first controllable bypass means disposed between said first adjustable valve means and said first hydraulic motor for causing said hydraulic fluid to bypass said first hydraulic motor;
second controllable bypass means disposed between said second adjustable valve means and said second hydraulic motor for causing said hydraulic fluid to bypass said second hydraulic motor; and
means, responsive to said vehicle speed, for turning on and off each of said first plurality of spray guns and each of said second plurality of spray guns and controlling said first and second controllable bypass means so that the rates of said hydraulic fluid flow through said first and second adjustable valve means are uneffected by said turning on and off of each of said first and second pluralities of spray guns.

11. A system for automatically controlling the rate at which a substance is deposited from a moving vehicle onto an adjacent surface to form a coating of uniform thickness comprising:
a hydraulic motor;
a hydraulic pump for pumping hydraulic fluid through said hydraulic motor to operate said motor at a rate which varies as a function of the rate at which fluid is pumped therethrough;
adjustable valve means for limiting the rate of flow of hydraulic fluid between said hydraulic pump and said hydraulic motor;
means connected to and operated by said motor for spraying said substance from said vehicle at a rate which varies with the rate of operation of said motor, said spraying means including at least one spray gun and a substance pump for pumping said substance through said at least one spray gun;
controllable means, disposed between said adjustable valve means and said hydraulic motor, for causing said hydraulic fluid to by-pass said hydraulic motor;
means, responsive to said vehicle speed, for turning on and off said at least one spray gun and controlling said controllable by-pass means so that the amount of hydraulic fluid by-passing said at least one hydraulic motor increases for each spray gun that is turned off; and
means for automatically adjusting said adjustable valve means in order to control the rate of fluid flow through said adjustable valve means as a function of vehicle speed to cause a uniform coating to be deposited on said adjacent surface.

12. A system as in claim 4 or 11 wherein said automatically adjusting means includes a tachometer generator whose output is responsive to the vehicle speed.

13. A system as in claim 4 or 11 wherein said hydraulic pump means is adapted to be driven by a power take-off mounted on said vehicle.

* * * * *

Disclaimer and Dedication 4,247,045.—*Wayne R. Mitchell*, Muncy and *Kenneth Wands*, Riverside, Pa. AUTOMATIC VOLUME CONTROL SYSTEM. Patent dated Jan. 27, 1981. Disclaimer and Dedication filed Sept. 1, 1983, by the assignee, *Redland Prismo Corp.*

Hereby disclaims and dedicates to the Public the remaining term of said patent.

[*Official Gazette December 6, 1983.*]